United States Patent [19]

Geus et al.

[11] Patent Number: 5,429,743
[45] Date of Patent: Jul. 4, 1995

[54] INORGANIC COMPOSITE MEMBRANE COMPRISING MOLECULAR SIEVE CRYSTALS

[75] Inventors: Eduard R. Geus, Bilthoven; Jacobus C. Jansen; Blandikus C. Jaspers, both of Delft; Johannes Schoonman, Wassenaar; Herman van Bekkum, Vlaardingen, all of Netherlands

[73] Assignee: Technische Universiteit Delft, Delft, Netherlands

[21] Appl. No.: 98,287
[22] PCT Filed: Feb. 7, 1992
[86] PCT No.: PCT/NL92/00029
§ 371 Date: Aug. 4, 1993
§ 102(e) Date: Aug. 4, 1993
[87] PCT Pub. No.: WO92/13631
PCT Pub. Date: Aug. 20, 1992

[30] Foreign Application Priority Data

Feb. 7, 1991 [NL] Netherlands .................. 9100217

[51] Int. Cl.⁶ .................. B01D 29/00; B01D 39/00
[52] U.S. Cl. .................. 210/490; 210/500.22; 210/500.25; 210/506; 264/45.5; 264/139; 502/4; 502/64; 502/71; 96/4; 96/11
[58] Field of Search .................. 210/490, 500.25, 506, 210/500.22, 502.1; 264/45.1, 45.5, 139, 140; 502/4, 64, 71; 95/50, 54, 130; 96/4, 11; 428/688, 689

[56] References Cited

U.S. PATENT DOCUMENTS

| | | | |
|---|---|---|---|
| 2,924,630 | 2/1960 | Fleck et al. | 260/676 |
| 4,012,206 | 3/1977 | Macriss et al. | |
| 4,699,892 | 10/1987 | Suzuki | 502/4 |
| 4,800,187 | 1/1989 | Lachman et al. | 502/64 |
| 5,110,497 | 5/1992 | Haag et al. | 210/650 |
| 5,127,925 | 7/1992 | Kulprathipanja | 95/54 |

FOREIGN PATENT DOCUMENTS

| | | |
|---|---|---|
| 0135069 | 3/1985 | European Pat. Off. |
| 0460512 | 12/1991 | European Pat. Off. |
| 2641631 | 3/1978 | Germany |
| 3827049 | 2/1990 | Germany |
| 60-129119 | 7/1985 | Japan |

Primary Examiner—Robert A. Dawson
Assistant Examiner—Ana M. Fortuna
Attorney, Agent, or Firm—Peter L. Michaelson; Edward M. Fink

[57] ABSTRACT

Inorganic composite membrane containing molecular sieve crystals, the membrane having a macroporous support to which molecular sieve crystals and modifications thereof have been applied substantially as monolayer, the crystals have been oriented to a substantial extent, such that the pores of the sieve crystals form a significant included angle with the support surface, the membrane has a gastight matrix present between the crystals.

18 Claims, 5 Drawing Sheets

INORGANIC COMPOSITE MEMBRANE COMPRISING MOLECULAR SIEVE CRYSTALS

This invention relates to an inorganic composite membrane containing molecular sieve crystals and to methods for producing such a membrane. For separation on a molecular level, such as gas separation, vapor permeation and pervaporation, mainly membranes on the basis of organic polymers have been proposed so far for use on an industrial scale. A wide variety of macromolecular (almost exclusively organic) materials have been found to be suitable for use as a membrane material. Reasonable separation factors can be achieved, and the throughput of such membranes is sufficiently large.

However, these polymer membranes have the disadvantage of a relatively short service life. Owing to the sensitivity of the materials to solvents (swelling) and the low stability at high temperatures, the range of application is limited. Moreover, regeneration by oxidative removal of impurities is not possible.

Also known are so-called ceramic membranes composed substantially of inorganic materials, which, compared with polymer membranes, have the advantage that they are resistant to high temperatures, so that regeneration is possible, and moreover are relatively inert. Such membranes are usually produced starting from multi-layered systems, in which a relatively thick macroporous layer serves as a support for a microporous top layer which is much thinner relative to the supporting layer and exhibits the separation properties. The production of such membranes, in which the so-called sol-gel or dip-coating techniques can be used successfully for providing the separating layer, is described inter alia in the following publications: A. Larbot, A. Julbe, C. Guizard, L Cot, J. Membr Sci., 93, (1989), 289-303; A. Larbot, J. P. Fabre, C. Guizard, L. Cot, J.Am.Ceram.Soc., 72, (1989), 257-261; W. A. Zeltner, M. A. Anderson, "Chemical Control over Ceramic Membrane Processing: Promises, Problems and Prospects", in: Proc. 1st Int.Conf.Inorg.Membr., (eds. J. Charpin, L. Cot), Montpellier, France, July 3-6, 1989, 213-223; A. Leenaars, Preparation, Structure and Separation Characteristics of Ceramic Alumina Membranes, PhD thesis, University of Twente, Netherlands, (1984); H. M. van Veen, R. A. Terpstra, J. P. B. M. Tol, H. J. Veringa, "Three-Layer Ceramic Alumina Membrane for High Temperature Gas Separation Applications", in: Proc. 1st Int.Conf.Inorg.Membr., (eds. J. Charpin, L. Cot), Montpellier, France, July 3-6, 1989, 329-335.

A disadvantage of such ceramic membranes is that the separation efficiency is low. In most ceramic membranes developed so far, separation takes place on the basis of Knudsen diffusion. In that case, the rate of transport is inversely proportional to the square root of the molecular weight. The selectivity of the separation process is sufficient only if molecules having widely divergent molecular weights are to be separated from each other.

Improved insights have led to separation processes on the basis of ceramic membranes exhibiting material transport mechanisms other than Knudsen diffusion, such as surface diffusion or capillary condensation: R. J. R. Uhlhorn, "Ceramic Membranes for Gas Separation; Synthesis and Transport Properties", PhD thesis, University of Twente, Netherlands, (1990). In the case of surface diffusion, use is made of differences in chemical and/or physical properties of the molecules to be separated. The surface of the separating (or active) part of the membrane is modified in such a manner that one type of molecule is transported much more rapidly than the other as a result of a difference in surface diffusion. However, the insight into the mechanism of surface diffusion is still poor, so that it is difficult to make appropriate use of differences in chemical and/or physical properties.

In capillary condensation and multilayer diffusion, use is made of the formation of a liquid phase in the separating part of the membrane. Here, too, it may be advantageous to modify the surface of the membrane. Although the separation efficiency can be high, the implementation of the separation process is strongly bound by specific values of process parameters such as temperature and pressure, as a result of the vapor tension of the condensing material.

Another drawback of the known ceramic membranes is that the pore size distribution is hard to control. Because the pores of the active layer are not uniform in size and shape, it is not possible to have such a membrane function as a molecular sieve. It has moreover been found to be very difficult to prepare a microporous layer that is stable under process conditions.

The use of crystalline microporous materials renders it possible in principle to exactly adjust the pore size distribution on a molecular level. There is a wide variety of such materials, of which particularly the zeolites (microporous aluminosilicates) are frequently used on an industrial scale. Zeolites are now being used as adsorbent, ion exchanger and catalyst. Due to the molecular sieve properties, processes with a high selectivity can be carried out. However, the molecular sieve properties are optimally used only if these materials are arranged in a membrane configuration.

In the development and use of such membranes, it is of essential importance that information be available on mass transport by the zeolite crystals (cf R. M. Barrer, J.Chem. Soc. Faraday Trans., 86 (7), (1990), 1123-1130. Hayhurst and Paravar studied the diffusion of alkanes, using a zeolite membrane configuration (A. R. Paravar, D. T. Hayhurst, "Direct Measurement of Diffusivity for Butane Across a Single Large Silicalite Crystal", 6th Int. Zeol.Conf., (Eds. D. Olson, A. Bisio), Reno, USA, July 10-15, (1983), 217-224; D. T. Hayhurst, A. R. Paravar, Zeolites 8, (1988), 27-29). In this study, use was made of a twin silicalite crystal in an organic matrix and a low feed gas pressure.

Werner and Osterhuber studied the permeation through a faujasite type (NaX) single crystal, using a substantially higher feed gas pressure. (D. L. Wernick, E. J. Osterhuber, "Diffusional Transition in Zeolite NaX: 1. Single Crystal Gas Permeation Studies", 6th Int.Zeol.Conf., (Eds. D. Olson, A. Bisio), Reno, USA, July 10-15, (1983), 122-130; D. L. Wernick, E. J. Osterhuber, J.Membr.Sci. 22, (1985), 137-146).

The most favorable configuration for a membrane having molecular sieve properties is realized if the molecular sieve crystals form the only separation between two fluids. In that case, molecules can pass directly from the first (retentate) phase to the second (permeate) phase only via the micropores of the molecular sieve crystals.

It is difficult, however, to arrange molecular sieve crystals in a membrane configuration. Proposals are known where the molecular sieve crystals are included in a polymer phase (cf Dutch patent application 8800889; European patent application 0 254 758, and U.S. Pat. No. 4,740,219).

Further known are various ceramic membranes produced using molecular sieve crystals. Different methods have been proposed for including molecular sieve crystals in a macroporous support which either have initially been hydrothermally synthesized or are crystallized in situ in or on the support. Further, membranes have been prepared in which on a macroporous ceramic support an ultrathin layer of molecular sieve crystals in a ceramic matrix is dispersed. This has also been done without using a macroporous support (cf. European patent applications 0 180 200, 0 135 069, and 0 265 018; U.S. Pat. Nos. 4,699,892 and 4,800,187; Canadian patent 1,235,684 and Japanese patents 63291809 and 60129119).

The above-mentioned ways of preparing membranes start from very small sizes of the molecular sieve crystals. Material transport through micropores proceeds very slowly and is inversely proportional to the thickness of the membrane. In general, therefore, active layers of a few micrometers or less are used. In many cases, the molecular sieve crystals are selected more than one order smaller than the thickness of the active layer.

A great disadvantage of using very small crystals is that it is virtually impossible to realize the optimum configuration of the molecular sieve crystals in the membrane. This is caused by the poor manageability of such small particles. The passage through the separating top layer requires that the pores of the crystals be in proper alignment in the direction of the material transport through the membrane. The possibility exists that this is the case only to a limited extent, so that large parts of the membrane surface are not permeable. Moreover, in practice, material transport along the molecular sieve crystals cannot be precluded completely, which causes a strong reduction of the selectivity.

Therefore, according to the invention, a membrane with molecular sieve properties is proposed, in which the above-mentioned disadvantages do not occur. The membrane according to the invention comprises a macroporous support to which molecular sieve crystals have been applied substantially as a monolayer, between which crystals is present a matrix gastight at least to a degree sufficient under practical conditions.

In the membranes according to the invention, the orientation of the molecular sieve crystals on the support is important. In nature, a wide variety of molecular sieves are known, while intensive research has led to a much larger number of synthetic molecular sieves. Each type has a specific pore structure, and often the chemical composition is also fixed to a certain degree. The morphology may be different for each molecular sieve, although it can generally be influenced. Finally, the particle size for each molecular sieve is also adjustable to a certain maximum size.

In the membranes according to the invention, the morphology, the particle size and the pore structure of the molecular sieve crystals are important parameters. Molecular sieves may have a one-, two- or three-dimensional pore structure. In the case of a three-dimensional pore structure, in which the pores are equal in all three main directions (e.g., zeolites A, X and Y), the particle size is important. Since the crystals having a regular morphology crystallize out (cubic: zeolite A, or octahedral: zeolites X and Y), orientation on the support is of minor importance. To properly arrange such crystals in a membrane configuration, the crystal size is preferably at least 10 $\mu$m.

If, however, the pores of a type of molecular sieve extend only in two or even one main direction (for instance, AlPO$_4$-5, VPI-5, mordenite and Nu-10), the crystals must be oriented on the support in such a manner that to a substantial extent the pores of the crystals form a significant included angle with the support surface. If such a type of molecular sieve is arranged in the membrane configuration according to the invention, the crystal morphology is of great importance. It has been found that many molecular sieves preferably crystallize out in the form of needles, the pores being oriented exactly in the direction of the long axis. In that case, incorporation in a membrane according to the invention becomes virtually impossible. In many cases, however, it is quite possible to influence crystallization in such a manner that the molecular sieve crystallizes out in a flat form, with the pores oriented exactly in the direction of the minimal size. It is preferred to use molecular sieves of such a morphology, because then a relatively large surface is covered with each crystal. Moreover, the thickness of the active layer is thus reduced as much as possible.

For such types of molecular sieves, the thickness of the crystals is preferably not less than 2 $\mu$m. The width and length of the crystals is preferably at least 10 $\mu$m, so that the orientation on the support in the desired direction can be properly realized. Although crystals in the form of sheets or tiles are preferred, this is not a prerequisite.

In the membrane according to the invention, therefore, in principle any type of molecular sieve can be used. It is to be expected that for most types of molecular sieves, crystals having a suitable morphology can be obtained. For different types of molecular sieves, the preparation of large crystals has already been extensively studied and described in the literature. In this connection, reference may be made to, for instance, the following publications: J. F. Charnell, J. Crystal Growth 8, (1971), 291. This publication describes the preparation of large crystals of the molecular sieve types A and X, the crystals of the A-type being cubic and of the X-type octahedral.

The preparation of a molecular sieve of the ALPO$_4$-5 type (AFI; a porous aluminum phosphate) is described in U.S. Pat. No. 4,310,440 and in the publication by S. T. Wilson et al. in J.Am.Chem.Soc. 104, (1982), 1146. The preparation of this type of molecular sieve is also described by S. Qiu et al in Zeolites 9, (1989), 440-444, according to which also very large single crystals can be formed. It is a disadvantage of this synthesis, however, that the pores are in the longitudinal direction of the crystals. The preparation of an AlPO-type molecular sieve having very wide pores (VPI-5) is described by M. E. Davis et al. in Zeolites 8, (1988), 362.

A special example is zeolite ZSM-5 (MFI). This type of molecular sieve has been extensively studied, and different morphologies of this type are known. Although this zeolite exhibits a three-dimensional pore structure, a pore direction can actually be indicated in two main directions only: the so-called straight and sinusoidal channels. There are different publications indicating that the transport through the straight and sinusoidal channels is not completely identical (for instance, E. R. Geus et al. in "Zeolites for the Nineties", Recent Research Report, Book of Abstracts of 8th Int- .Conf. on Zeolites, Amsterdam, (1989), No. 135, 293-295).

The two most frequent morphologies of ZSM-5—the prismatic and cube or tile morphology—can be prepared in different ways. When crystals having the prismatic morphology are arranged in a membrane configuration according to the invention, there is a random distribution of straight and sinusoidal channels. When cubical crystals are used, a membrane with mainly straight channels can be produced, because there is one clear preferred orientation. Therefore, with these two different morphologies of ZSM-5 type crystals, membranes of dissimilar properties can be prepared.

U.S. Pat. No. 3,702,886 discloses the preparation of a molecular sieve of the ZSM-5 type. The preparation of an aluminium-deficient variant of ZSM-5 (silicalite) has been described by E. M. Flanigen et al. in *Nature* 271, (1978), 512. The preparation of large cubical single crystals of ZSM-5 is described by H. Lermer et al. in Zeolites 5, (1985), 131. For the so-called Sand synthesis for the preparation of prismatic crystals of ZSM-5, reference may be made to the publication by M. Ghamani et al. in Zeolites 3, (1983), 155-162. The fluoride synthesis for the preparation of prismatic crystals of ZSM-5 is described by J. L. Guth et al. in: "New Developments in Zeolite Science and Technology", Y. Murakami, A. Iyima, J. W. Ward (Eds), Proc. 7th Int.Conf. on Zeolites, Tokyo, Japan, August 17-22, (1986), Kodansha, Tokyo and Elsevier, Amsterdam, 121-128. It has recently been found that by adding other elements (for instance, boron) crystals of the ZSM-5 type can be formed with the tile morphology (for instance, J. C. Jansen et al. "Isomorphous Substitution of Si by B, Al, Ga, and Be during Crystallization of Large Single Crystals of Zeolite. Part I. on the Maximum Boron Content of ZSM-5", in "Innovation in Zeolite Materials Science", F. J. Grobet et al. (Eds), Elsevier, Amsterdam, (1988), 133-141; J. C. Jansen et al. "Isomorphous Substitution of Si in Zeolite Single Crystals. Part II. on the Boron Distribution and Coordination in [B]-ZSM-5", in "Zeolites: Facts, Figures, Future", P. A. Jacobs and R. A. van Santen (Eds), Elsevier, Amsterdam, (1989), 679-688). In addition to the advantage of one preferred orientation, the particle size distribution is very narrow and can be optimally adjusted. The yield of the synthesis is high, and a pure product is formed. Finally, a pure silicon dioxide lattice can be formed by means of a so-called postsynthesis, which strongly reduces the sensitivity to clogging.

An example of a molecular sieve which, in the first instance, yielded predominantly crystals in the form of needles is mordenite. By means of adaptation of the synthesis, however, it has been found possible to strongly inhibit the crystal growth in the direction of the channels, so that crystals having a suitable shape were obtained (cf P. Bodart et al. "Study of Mordenite Crystallization III: Factors Governing Mordenite Synthesis", in "Structure and Reactivity of Modified Zeolites", P. A. Jacobs et al. (Eds), (1984), Elsevier, Amsterdam, 125-132).

In this connection, it is observed that German Offenlegungsschrift 38 27 049 describes the preparation of zeolitic membranes, in which a fully continuous layer, which is not a monolayer, of zeolite crystals is formed on a porous support. According to the process described, this layer is obtained by first making the surface of the support seed-active and then dipping the support in a solution containing the components for forming the zeolitic material. The thus applied layer is then brought to crystallization. This must be carried out several times. Apart from the fact that by using this method only a few types of zeolite layers can be applied (only zeolite A is discussed in an example), it is difficult to carry out the crystallization in a controlled manner such that a well defined crystal film is obtained at the surface. For this reason, it is hardly possible to fully avoid material transport along the crystals, which adversely affects the separation selectivity. Moreover, for molecular sieves having an asymmetric pore structure, crystallization must be thoroughly controlled so that the crystals are correctly oriented on the support.

BRIEF DESCRIPTION OF DRAWINGS

The invention will be more readily understood by reference to the following detailed description taken in conjunction with the accompanying drawing wherein.

DETAILED DESCRIPTION

Figure 1:
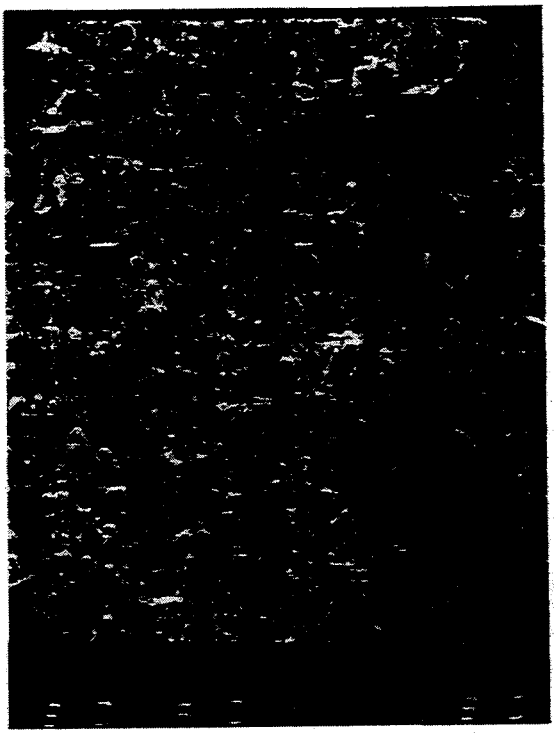
FIG. 1 is a photograph of a porous clay layer suitable for embedding of crystals deposited upon a two layer support member.
Figure 2:
FIG. 2 is a photograph of a silicalite crystal embedded in a deposited clay layer.
Figure 3:
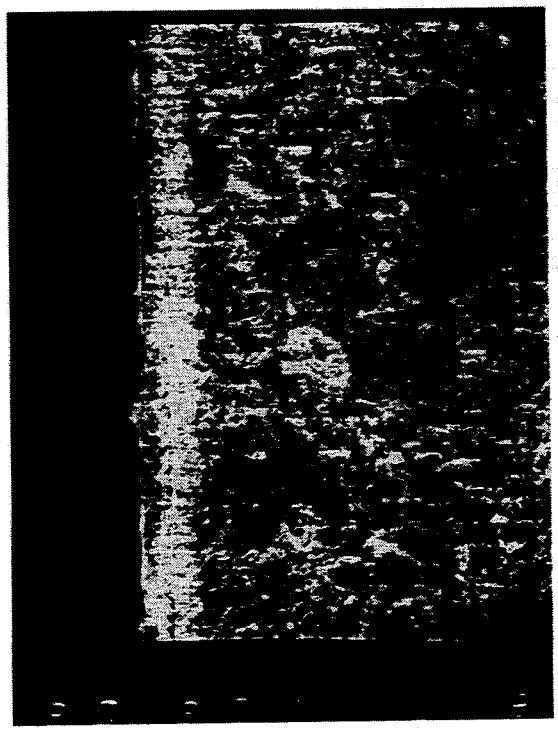
FIGS. 3-5 are photographs of an alumina support member having deposited thereon a clay suspension containing embedded zeolite crystals and a homogeneous gastight glaze film.
Figure 4:
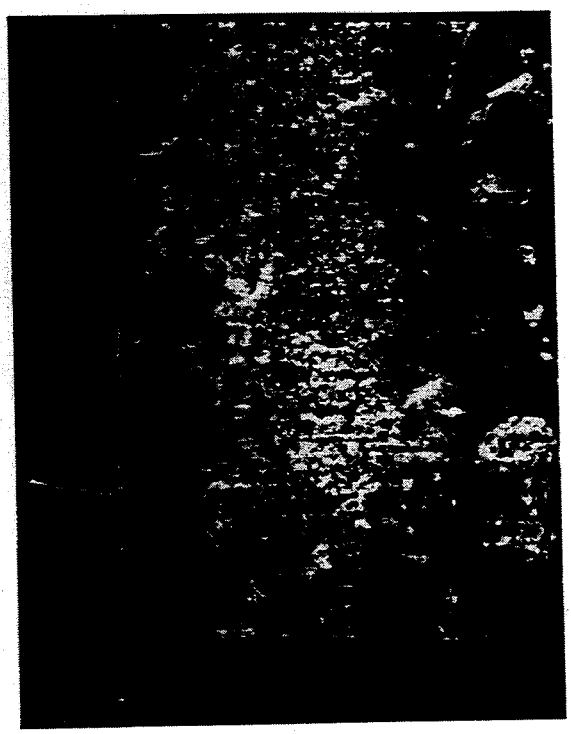
Figure 5:
Figure 6:
FIG. 6 is a photograph of a silicalite crystal incorporated in a clay layer on a support member with a glaze applied thereto.
Figure 7:
FIG. 7 is a photograph of four (4) juxtaposed silicalite crystals embedded in a layer of clay and disposed upon an alumina support member to which a thin glaze film has been applied.
Figure 8:
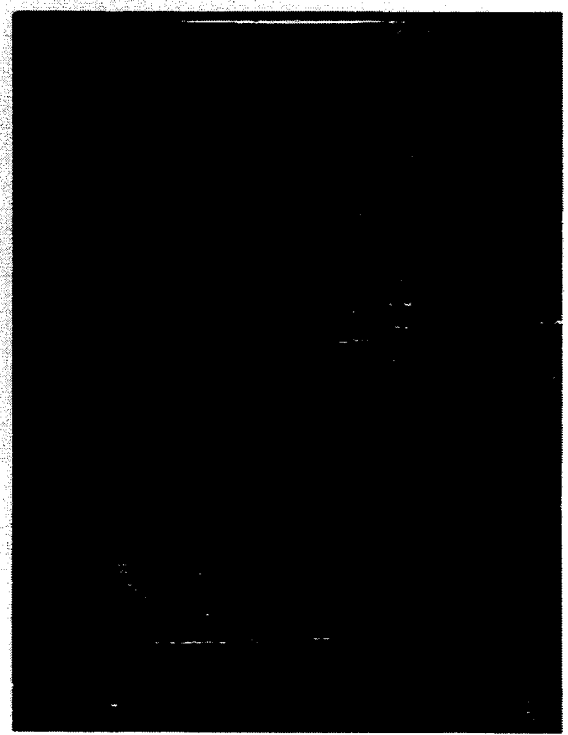
FIG. 8 is a more detailed photograph of the structure shown in FIG. 7.
Figure 9:
FIGS. 9-12 are photographs of small holes present in a continuous glaze films prepared in accordance with the present invention.
Figure 10:
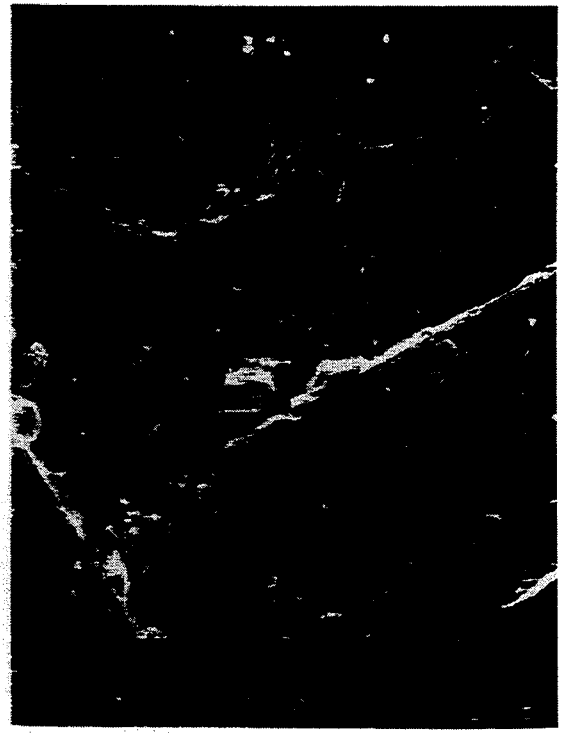
Figure 11:
Figure 12:
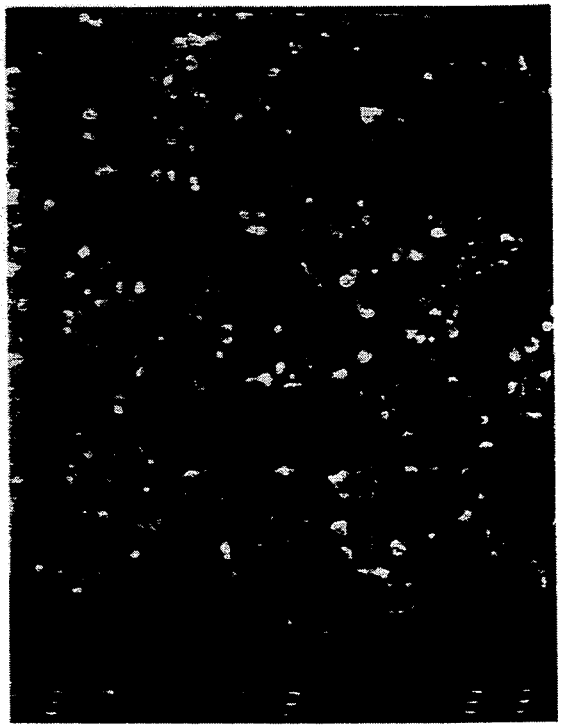
Figure 13:
FIG. 13 is a photograph of a wide crack in the top layer of a membrane prepared in accordance with the present invention, the crack being attributed to forced clamping in a measuring cell.
Figure 14:
FIGS. 14 and 15 are photographs of bonding effected between a glaze layer and an alumina layer used in the practice of the present invention.
Figure 15:
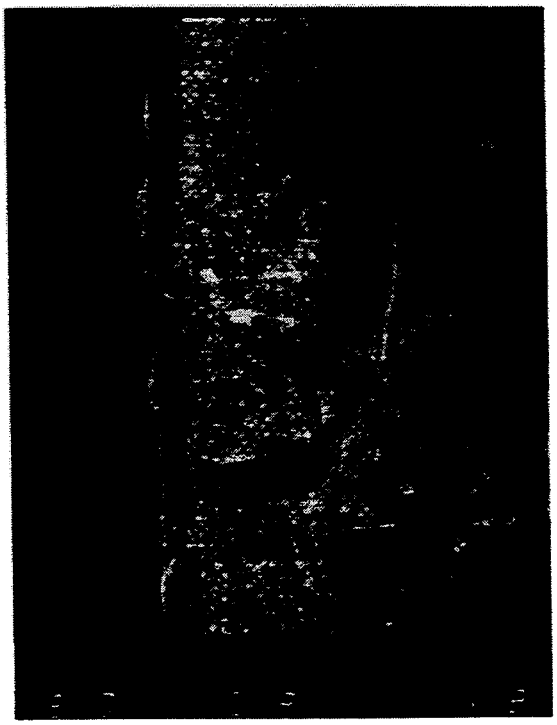
Figure 16:
FIG. 16 is a photograph of the membrane of FIGS. 14 and 15 after the deposition thereon of a thin glaze film.
Figure 17:
FIG. 17 is a photograph of a membrane in accordance with the present invention showing that the deposition of a glaze powder under zeolite crystals is avoided by appropriate disposition of crystals and support member.
Figure 18:
FIG. 18 is a photograph of a crystal embedded in a glaze matrix which was polished until the crystal surface was reached.

In the membrane according to the invention, as stated before, a collection of molecular sieve crystals was spread as a monolayer over the surface of a macroporous, in particular an inorganic, support.

The support must be sufficiently flat to orient the molecular sieve crystals in one plane. Different materials are suitable as a coarse-porous, inorganic support. Thus, a metal support starting from sintered metal powder can be used, but so can oxidic (ceramic) supports. Different types of supports are commercially available.

As a support, a two-layered system is preferred. In that case, the coarse-porous part of the support gives the necessary support, and the flat orientation of the molecular sieve crystals can be properly realized on the relatively thin top layer.

A gastight ceramic matrix, at least sufficiently gastight for practical use, must be disposed between the molecular sieve crystals on the support, so that material transport is only possible via the micropores of the molecular sieve crystals. Requirements are further imposed on the chemical and mechanical properties of this matrix. Thus, the material must be inert under process conditions. Further, the matrix material must have a correct combination of properties (modulus of elasticity and thermal expansion coefficient), so that during the process conduct the membrane remains intact.

This invention also relates to a method of producing an inorganic composite membrane having molecular sieve properties. According to this process, a layer, substantially a monolayer, of relatively large molecular sieve crystals is applied to a macroporous support, between which crystals a gaslight matrix is provided.

The object of the methods according to the invention is to obtain the highest possible degree of coverage of molecular sieve crystals on the support. In this way, the maximum effective membrane surface is realized. The form of the crystals plays an important part in their application to the support. The sheet-like crystals of zeolite ZSM-5 referred to above will be applied to the support with the correct orientation almost without an exception. In addition to the form of the crystals, the uniformity of the particle size is also important. In that case, it appears that a very high degree of coverage can be realized. Moreover, in that case the diffusion path is equal in the whole membrane, so that a membrane having very constant properties can be produced. The particle size distribution can be properly controlled by means of the crystallization process. In addition, there is the possibility of fractionation, for instance, by using sieves. Particularly in the case of single crystals, the use of sieves will be advantageous, as has been demonstrated in the fractionation of silicalite crystals. It appears that due to the prismatic form of this molecular sieve only the single crystals can pass through the smallest sieve openings ($<38$ $\mu$m). Material grown together will generally be too broad.

According to one method, an amount of molecular sieve crystals which is sufficient and not too large to form a monolayer is scattered on the support. When subsequently, for instance by means of low-frequency vibrations, a monolayer is formed, it appears that a degree of coverage of about 80% can be realized. An even higher degree of coverage can be realized by means of a liquid flow over a porous support saturated with the same liquid, which support pushes up the molecular sieve crystals to form an almost continuous layer on the support.

It is also possible to treat the molecular sieve crystals, in the first instance, with a surfactant, so that the crystals obtain a surface having a hydrophobic character. Thus treated molecular sieve crystals remain afloat on water and are found to assume substantially a juxtaposed position. A macroporous support can be disposed under the thus formed monolayer of molecular sieve crystals, after which the water level is lowered to the upper side of the support. The crystals are thus applied to the support in a high coverage.

In the preparation of the membranes according to the invention, it is generally advantageous to attach the molecular sieve crystals to the support to a certain degree before applying the matrix material. This attachment may be effected in different ways. When starting from a monolayer of loose molecular sieve crystals on an inorganic support, an attachment that is sufficient in many cases can be realized through absorption of water or a colloidal suspension of an oxide by the support and then drying (optionally at elevated temperatures) of the entire system. The attachment, however, can be improved by applying to the macroporous support an ultrathin coating of an oxide or a mixture of oxides which already liquefies at relatively low temperatures. A layer of, for instance, borosilicate glass (BSG) can be deposited on the surface of an inorganic macroporous support by means of CVD (chemical vapor deposition) techniques. Here, clogging of the macroporous support does not occur, because the deposited layer is too thin for that. Subsequently, a monolayer of molecular sieve crystals is applied to the thus modified support in an otherwise similar manner, after which the temperature is increased to the liquefying temperature of the mixing oxide. Upon cooling, a glass phase is formed again, fixing the molecular sieve crystals to the support.

In an alternative method of bonding molecular sieve crystals to the support, use is made of a silicone paste. Such material is viscoelastic for a limited period of time. By pressing the molecular sieve crystals into the layer of silicone paste within this period, a proper attachment is realized. During baking out of the silicone paste, a porous silica film is formed in which the molecular sieve crystals are properly attached. This method is also suitable if a solution of a silicone rubber or a highly viscous silicone oil is spread as a blanket over molecular sieve crystals and support. The polymer solution is prevented from penetrating into the pores of the macroporous support by filling the support with, for instance, water. The solvent is evaporated, and, after baking out, a similar silica film results. In principle, in this manner other polymers can also be applied as a film, which are completely burned during baking out. In that case, any polymer film (e.g., polychloropropene or polybutadiene) may be applied. Such an attachment method may be useful if the actual matrix material can be applied at low temperatures. An additional advantage is that the pores of the support are temporarily clogged, so that no matrix material can be deposited between the molecular sieve crystals and the support.

According to a preferred method, the molecular sieve crystals are attached to the support using a highly diluted clay suspension. Molecular sieve crystals to some extent attached to the support are incorporated in a clay suspension by pouring an extremely diluted clay suspension over the support. After baking out, a ceramic layer is obtained which is thinner than the molecular sieve crystals, so that these protrude. It is also possible to apply the clay layer by means of a dipping technique. Then, too, the starting material may be molecular sieve crystals that are already attached to some extent. In an alternative method, the starting material is a clay suspension in which the molecular sieve crystals are already dispersed. In this case, the suspension is spread over the surface of the macroporous support. The degree of coverage of the membrane surface is then properly adjustable by setting a high concentration of molecular sieve crystals. If a sufficiently homogeneous layer cannot be obtained in one step, a homogeneous layer can still be obtained by means of a clay suspension applied according to the first-mentioned method.

In another preferred method, the starting material is a commercial alumina support (coarse-porous) which is provided with a thin clay layer according to one of the above methods. The thus modified support is baked out, and a two-layered support is obtained, on which the molecular sieve crystals can be excellently oriented, for instance, by means of directed low-frequency vibrations. Subsequently, the whole pore volume of the support is filled with water, followed by a mild heat treatment. The molecular sieve crystals are thus sufficiently attached to the support to properly carry out the subsequent steps in the membrane synthesis.

After the molecular sieve crystals have been applied to the support as a monolayer and have optionally been attached thereto, the gastight matrix is applied to the support between the molecular sieve crystals.

According to the invention, different known techniques are suitable for applying the matrix. A distinction is made between methods by which matrix material is applied as a blanket over both the support and the crystals and methods by which it is selectively deposited between the crystals. Preferably, deposition methods are used by which matrix material is selectively applied between the crystals, because it is not necessary, then, to remove part of the matrix material on the crystals.

By using generally known sol-gel techniques, also discussed in the above literature, a thin layer of matrix material can be reproducibly deposited. A great advantage of the sol-gel technique is the good homogeneity of the deposited material. The composition of the gel is determined during the preparation of the sol, in which the different components can be simply mixed on a molecular scale. Thus, sols of mixing oxides can be simply prepared by mixing the corresponding metal alkoxides with a solvent and water. Similarly, collodial suspensions can be prepared very homogeneously. Binders may be added to give the sol the desired physical properties. In addition, so-called DCCAs (Drying Controlling Chemical Agents) may be added. Thus, the drying process is better controlled, so that no cracks are formed in the film.

The sols may be applied in different manners to the support provided with a monolayer of molecular sieve crystals. The simplest method is to pour out the sol over the support surface. Because the viscosity of the sol has been set high by means of additives, the sol does not penetrate into the support.

According to another suitable method, use is made of the so-called spin-on technique (cf T. Bein et al. in Stud. Surf. Sci.Catal. 49, (1989), 887-896), in which a flat support is rotated very rapidly. By using this method, a very homogeneous layer of matrix material can be deposited on a support.

According to yet another method, use is made of the known dip-coating technique referred to above (cf A. Leenaars, "Preparation, Structure and Separation Characteristics of Ceramic Alumina Membranes", PhD thesis, University of Twente, Netherlands, (1984); H. M. van Veen, R. A. Terpstra, J. P. B. M. Tol, H. J. Veringa, "Three-Layer Ceramic Alumina Membrane for High Temperature Gas Separation Applications", in: Proc. 1st Int.Conf.Inorg.Membr., (Eds. J. Charpin, L. Cot), Montpellier, France, July 3-6, 1989, 329-335). According to this technique, a suitable sol is contacted with the dry substrate for a period of time to be controlled very accurately. At the surface of the substrate, a phase separation of the sol takes place, comprising absorption of the liquid into the porous support and deposition of the sol particles as a layer on the support. In the last-mentioned technique, there will be almost exclusive deposition beside the molecular sieve crystals, because the phase separation will only take place on the surface of the macroporous support.

After drying the gel, a xerogel is formed having a very high surface if the sol composition is appropriately chosen. As a result, the gel is very sintering active, so that during a heat treatment an irreversible transition of the gel occurs and a dense film results. By properly adjusting the composition of the gel and the heat treatment to each other, a gastight layer of a metal oxide can already be obtained at relatively low temperatures (400°–500° C.). By an appropriate selection of the composition of a mixing oxide, the sintering properties can be improved, because such materials are usually sintering active already at lower temperatures.

By employing a method utilizing the above-mentioned CVD technique (Chemical Vapor Deposition), a matrix can be deposited from the gaseous phase at elevated temperatures. With this method, too, it is possible to deposit layers of one metal oxide or a mixture of oxides. For nearly every metal, precursor molecules for carrying out the CVD process are available. Silicon dioxide films can be deposited, for instance, by means of the oxidation of silane or the pyrolysis of alkoxy silicates (for instance, the decomposition of tetraethyl orthosilicate; B. Delperier et al., "Silica CVD from TEOS on Fe/Cr/Ni Alloy", Proc. 10th Int.Conf. on CVD, The Electrochem. Soc., Pennington, New Jersey, (1987), 1139-1146). However, for the production of a membrane according to the invention, the deposition of borosilicate glasses will be preferred, because in that case the deposition temperature can be considerably lower. The process by means of the oxidation of hydride compounds (silane and borane) has long since been known (e.g., W. Kern, R. C. Helm, J. Electrochem. Soc. 117, (1970), 562–567). The decomposition of alkoxides as the above-mentioned tetraethyl orthosilicate and trimethyl borate is advantageous, however, not in the last place because of the fact that such compounds are much less explosion-sensitive. Such processes have long since been known too (for instance, P. Eppenga, et al., Journal de Physique, Colloque C5, (1989), 575–584).

Because of the simple process conduct, the CVD process is preferably carried out under atmospheric pressure. In alternative methods, for instance, a plasma is used, so that these methods can be carried out at much lower temperature and, in many cases, at reduced pressure, because the reactant supply is limiting due to the low vapor tension of the reactants. The deposited layer may not yet be gastight after deposition. By means of a thermal posttreatment (optionally a hot pressing technique), however, a gastight layer can be formed in a simple manner.

In a special embodiment, use is made of the possibility of supplying the reactants separately. In that case, the process can be carried out in the membrane module itself. This is sometimes referred to as Chemical Vapor Infiltration (CVI). By properly adjusting the pressure on both sides of the substrate, it is possible to realize a very local deposition. Such a process has already been studied for a long time in connection with the development of solid fuel cells (SOFC). A thin film of yttrium-stabilized zirconia is deposited on a macroporous support as a top layer, the chlorides of yttrium and zirconium being presented on one side of the substrate and a mixture of oxygen and water on the other side. In the first instance, the deposition proceeds according to above-discussed CVD process. After the pores of the substrate have become clogged owing to the deposited layer, further growth takes place, because oxygen ions can diffuse through the deposited layer. Thus, layers having a thickness of 20 to 50 $\mu$m can be formed (cf U. B. Pal, S. C. Singhal, "Electrochemical Vapor Deposition of Yttria-Stabilized Zirconia Films", in Proc.1st Int.Symp. on Solid Oxide Fuel Cells, The Electrochemical Society, Vol. 89-11, (1989), 41–56; J. P. Dekker, N. J. Kiwiet, J. Schoonman, "Electrochemical Vapor Deposition of SOFC Components", in Proc.1st Int.Symp. on Solid Oxide Fuel Cells, The Electrochemical Society, Vol. 89-11, (1989), 57–66; Y. S. Lin et al., in Proc.1st Int.Symp. on Solid Oxide Fuel Cells, The Electrochemical Society, Vol. 89-11, (1989), 67–70; and N. J. Kiwiet, J. Schoonman, "Electrochemical Vapor Deposition: Theory and Experiment", in Proc. 25th Intersociety Energy Conversion Engineering Conference, Vol. 3, Paul A. Nelson, William W. Schertz and Russel H. Till (Eds), (1990), American Institute of Chemical Engineers, New York, 240–245.

In each of the above-mentioned CVD processes, very advantageous use can be made of an applied porous intermediate layer which partly fills the space between the molecular sieve crystals. Thus, the deposition of matrix material under the crystals can be avoided. This applies to the normal CVD processes but especially also to the above-described CVI process. In the CVD process, deposition on the molecular sieve crystals is hard to avoid. In the CVI process, this largely depends on the process conditions. Selective removal of matrix material on the molecular sieve crystals is quite possible, however, by means of polishing or etching techniques, which will hereinafter be explained.

In a preferred method of applying the matrix, glaze powders are used that melt at low temperatures. An advantage of using such glazes is the great freedom of composition of the matrix material, so that an optimum combination of material properties can be obtained. The glaze must liquefy sufficiently to result in a gastight and properly adhering layer during the heat treatment. The viscosity of the glass during the heat treatment must be sufficiently high, so that the glaze is only applied to the macroporous support. Because eventually the membrane will also be used at high temperatures, the temperature during preparation must be significantly higher than the process temperature. It is also necessary that the regeneration can be carried out at a considerably lower temperature than the preparation temperature. Suitable glazes are often commercially available.

The application of the glaze can be realized in many ways. For instance, a suspension of glaze powder can be applied over a monolayer of molecular sieve crystals on a macroporous support. Use can also be made of "spray" techniques, while glaze powder can also be applied to the support in dry form. If the molecular sieve crystals are attached to the support sufficiently firmly, the glaze can be selectively applied beside the molecular sieve crystals. In that case, a fine powder is applied over the entire support in dry form, whereafter powder located on the molecular sieve crystals is swept off. In such a method, it is desirable that the molecular sieve crystals be much larger than the powder particles of the glaze.

Preferably, the glaze is applied using a strongly diluted glaze suspension. This method can be carried out directly in a macroporous support in module form, for instance a tubular module. The molecular sieve crystals may already have been bonded to the support in one of the manners mentioned. However, it is also possible to apply the crystals to the support in situ from a suspension. In that case, the support is completely enclosed by a fluid phase. By allowing fluid to flow through the support continuously, the molecular sieve crystals are attached to the support surface. The glaze suspension is then added to the fluid flow and the glaze particles are retained as a filter cake on the free surface of the support. The fluid flow also fixes the glaze powder. By the accumulation of particles on the support, the pressure drop across the module increases over time. This pressure drop can serve as a measure for the thickness of the layer deposited. As soon as the layer has a sufficient thickness, the addition of the glaze suspension is discontinued. The powder particles present on the molecular sieve crystals are removed by the still ongoing fluid flow, while in the glaze powder layer further densification occurs. The fluid is then absorbed by the support, followed by a heat treatment.

According to a particularly suitable embodiment of the above-described method, use is made of the specific advantages offered by the dip process. The molecular sieve crystals are first attached to the macroporous support, preferably using the above-mentioned clay suspension. Then a glaze suspension of very fine powder is prepared. The homogeneous dispersion of powder particles is obtained through ultrasonic vibration of the suspension and subsequently allowing the larger particles to sink. The support, flat in this case, provided with molecular sieve crystals, is dipped into the glaze suspension for a few seconds by the side thereof on which the layer of glaze is to be deposited. This so-called dipping must be carried out carefully so as to prevent complete submersion of the support. Through phase separation, discussed above, glaze powder is selectively deposited beside the molecular sieve crystals on the support. A thin layer of extremely thin powder is formed, in which larger pores are clearly observable. During the temperature treatment, sufficient liquefaction occurs for a proper continuous glaze to be formed. The dip process can optionally be carried out several times in succession with intermediate drying of the substrate. Even after baking out, it is possible to carry out the dip process once more, which can be used with great advantage as an in situ repair technique.

As explained hereinabove, in a number of methods of applying the matrix material, this material is deposited as a blanket over both the support and the molecular sieve crystals. In that case, by means of etching or polishing, for instance, the matrix material is selectively removed from the molecular sieve crystals. These techniques are known per se. Depending on the flatness of the macroporous support and the particle size distribution of the molecular sieve crystals, either the polishing or the etching method is chosen. During the polishing procedure, the crystals are preferably additionally supported, for instance using a resin. A resin layer is applied to the top layer of the membrane, whereafter both the resin and the matrix material on the crystals are ground off gradually. The remaining resin is removed through oxidation or dissolution.

When an etching method is used for the removal of the matrix material from the molecular sieve crystals, this method may be a wet (chemical) or dry (via a plasma) etching method, depending on the compostion of the matrix material. Thus, for instance silicon dioxide can be removed in a very well controlled manner using an aqueous solution of hydrogen fluoride or using a plasma of a fluorocarbon compound such as $CF_4$ (Ch. Steinbrüchel et al., "Mechanism of Dry Etching of Silicon Dioxide", J.Electrochem. Soc. 132 (1), (1985), 180–186), $C_2F_6$ (T. M. Mayer, "Chemical Conversion of $C_2F_6$ and Uniformity of Etching $SiO_2$ in a Radial Flow Plasma Reactor", J.Electronic Soc. 9(3), (1980), 513–523), or $CHF_3$ (H. Toyoda et al., "Etching Characteristics of $SiO_2$ in $CHF_3$ Gas Plasma", J.Electronic Mat. 9 (3), (1980), 569–584). As will be clear, when the support is finished, the support can be removed using a suitable method depending on the support used, so that a membrane film is obtained.

The membranes according to the invention can be used for any application for which at present thermostable membrane configurations are proposed, and in particular for separations an molecular level. Because molecular sieves and in particular zeolites such as ZSM-5 and zeolite Y are used in catalysis, the invention also relates to a catalytically active membrane having molecular sieve properties.

For some decades now, research has been done into the use of catalytically active membranes. For an extensive review, reference is made to V. T. Zaspalis, Catalytically Active Ceramic Membranes; Synthesis, Properties and Reactor Applications, PhD thesis, University of Twente, Netherlands, (1990).

Such a membrane with catalytic properties can be obtained according to the invention by providing catalytic centres in the pores of the membrane and/or on the surface thereof prior to, during or after production, using a technique which is known per se.

Here, the thermal stability of a membrane thus obtained is essential because a great many catalytic processes take place at elevated temperatures (higher than permissible for organic polymers). In addition, it is often necessary to reactivate the catalyst (molecular sieve) in an oxidizing environment at elevated temperatures.

The catalytically active membranes according to the invention may contain the conventional catalytically active molecular sieves as well as molecular sieves modified, for instance, by isomorphous substitution, ion exchange or satellite formation.

The various stages of the production of the membrane according to the invention will now be further explained in and by the following examples and with reference to the accompanying photographs.

EXAMPLE 1 a) Preparation of uniform single crystals of ZSM-5/silicalite.

Silicalite crystals were prepared using the Sand method (Zeolites 3, (1985), 155–162). The synthesis mixture consisting of 27.2 tetrapropyl ammonium bromide (TPABr, CFZ), 207.2 g sodium hydroxide (NaOH, Baker), 167.4 g colloidal silicon dioxide (Ludox AS40, E.I. du Pont de Nemours) and 125.8 g water was heated for 162 h at 180° C. in a teflon-coated autoclave. In the last phase of the synthesis, the crystals were in a gel phase, which, using a caustic soda solution (0.5M) was removed at approx. 70° C. The crystals were calcined at 450° C. (temperature increase 1° C./min). Then the crystals were fractionated by means of sieves. The fraction smaller than 38 μm consisted exclusively of prismatic single crystals.

b) Applying a monolayer of silicalite crystals to an α-alumina support.

Silicalite crystals were applied to an α-$Al_2O_3$ two-layer support (NKA, Petten) of a diameter of 25 mm and a thickness of 2.5 mm. The supports used consisted of a coarse-porous support layer (pore diameter 2–8 μm) of pressed α-alumina granules, to which a thin layer of α-alumina had been applied via a slibcasting process (pore diameter 0.15 μm). Single crystals of silicalite (prismatic; length about 200 μm, thickness and width about 30 μm) were applied in dry form to the top layer of the support, whereafter through vibration at low frequency (1–4 Hz) virtually all crystals were positioned side by side on the support. In this manner, silicalite crystals with two orientations were obtained on the support. Both the straight and the sinusoidal channels serve as pores for the membrane, without a preference for either of the two channels. Then water was absorbed by the support, in such a manner that both the crystals and the support were completely moistened. The support was dried at about 50° C. The zeolite crystals were now weakly bonded to the alumina support.

c) Embedding the crystals in a porous clay layer.

A very strongly diluted clay suspension was prepared by mixing 3.75 g clay suspension (kaolin; Porceleine Fles, Delft), 0.08 g quartz flour and 30 g water. The suspension was well homogenized using an ultrasonic vibrating bath. Of this suspension, 0.5 ml was applied to the dry alumina support, provided with zeolite crystals. The suspension spread over the entire surface before the water penetrated into the support. The clay layer remained on the top of the support and as such embedded the zeolite crystals. The support was baked out in the following manner: 1° C./min: 20°–95° C.; for 30 min at 95° C.; 3° C./min: 95°–350° C./min; 2° C./min: 350°–900° C./min; for 60 min at 900° C.; 3° C./min: 900°–20° C.

Photograph 1 shows a picture of the clay layer on the two-layer support. Photograph 2 shows a silicalite crystal embedded in the deposited clay layer.

d) Applying the glaze film.

A suspension of 1.35 g glaze (lead borosilicate, melting point 800°–900° C.; Ferro B. V., Rotterdam) and 8.1 ml water was prepared. The suspension was homogenized for 5 min in an ultrasonic vibrating bath. The support was held in the suspension for 5 seconds and then dried in the air. In order to obtain a homogeneous, gastight glaze film, the following temperature programme was carried out: 5° C./min: 20°–95° C.; for 30 min at 95° C.; 1° C./min: 95°–550° C./min; for 300 min at 550° C.; 3° C./min: 550°–20° C.

Photographs 3–5 show the structure of the four-layer system formed in this manner. Photograph 6 shows a silicalite crystal which has been incorporated in the clay layer, whereafter a glaze film has been applied to the support.

EXAMPLE 2

Silicalite crystals were synthesized in the same manner as in Example 1. The crystals were applied to the alumina support in the same manner and weakly bonded.

A similar clay suspension was used to apply a clay layer between the crystals on the support. In this case, however, the clay layer was also applied by the dip process by dipping for 5 seconds. The clay layer was baked out in an otherwise similar manner.

The glaze film was applied and treated thermally in the same manner as in Example 1.

Photograph 7 shows a section of four juxtaposed silicalite crystals on the alumina support, embedded in a clay layer to which a thin glaze film has been applied. Photograph 8 shows the structure of the membrane in more detail.

EXAMPLE 3

In this example it is demonstrated that it is also possible, as a first step in the production of the membrane, first to modify the alumina support using the clay suspension. In that case it is not necessary to use a two-layer support.

In the same manner as described in Example 1, an accurately measured amount of clay suspension was applied over an $\alpha$-$Al_2O_3$ support consisting of one layer. The support modified in this manner was baked out in the same manner as described in Example 1 c) at 900° C. Then a monolayer of silicalite crystals was applied to the support in the same manner as described in Example 1. The bonding of the silicalite crystals was improved by baking out the still humid support according to the following temperature programme: 1° C./min: 20°–95° C.; for 30 min at 95° C.; 1° C./min: 95°–550° C./min; for 120 min at 550° C.; 2° C./min: 550°–20° C.

The dip process with a glaze suspension and the thermal posttreatment were carried out in the same manner as in Example 1.

The advantage of the use of glaze powders appeared to be that the drying step—unlike the sol-gel process—is not in the least critical. The powder particles do not form a continuous layer but during the subsequent temperature treatment liquefaction occurred to a sufficient degree for a covering layer to be formed. The dip process in the case of a glaze suspension appears to be little time-dependent as regards the amount of deposited material, which is an advantage over the dip coating process using colloidal soles.

Thus, a smooth, continuous glaze film was formed, which properly conformed to the irregularities of the support. In some supports the irregularities appeared to be too large, so that a few small holes were visible in the glaze coating (photographs 9, 10, 11 and 12). It appeared to be quite possible to further close these holes with the same dip coating process. Because the glaze suspension of water poorly moistens the glaze surface, it becomes possible to deposit virtually exclusively glaze powder on the holes still present. The redundant glaze powder can be removed using a water flow.

Using the dip coating technique, it also appeared to be possible to repair a composite membrane. Photograph 13 shows a wide crack (about 15 $\mu$m wide) in the top layer of the membrane, which was the result of forced clamping in a measuring cell. The crack, which extended centrally throughout the preparation, was completely filled with glaze powder. The preparation was baked out in the same manner as in Example 1 and appeared no close the crack completely.

Normally, the thin coating of glaze obtained exhibited no cracks, not even during repeated heating and cooling. Indentation tests demonstrated the much better mechanical strength of the thin glaze film relative to the thicker glaze film which was obtained by pouring an amount of glaze suspension over the support. The thin glaze film which has been formed using the dip coating technique appears to be much more homogeneous than the thicker glaze film formed through pouring of a suspension. This is partly due to the fact that in the dip process exclusively very small glaze powder particles are deposited.

EXAMPLE 4

The above experiments could also be carried out without using an intermediate layer. In that case, crystals were only weakly bonded to the $\alpha$-alumina support in the manner described in Example 1. Then a layer of glaze was applied by the dip process, whereafter the layer of glaze was melted by heating in an analogous manner to that in Example 1. It is possible that in this manner glaze also penetrates between the crystals and the support. The photographs 14 and 15 show the eminent bonding between the glaze film and the $\alpha$-alumina top layer. It appears a very thin glaze film can be applied uniformly over the entire support surface (photo 16). Photograph 17 demonstrates that deposition of glaze powder under the zeolite crystals can be prevented, provided crystals and support are sufficiently continuous relative to each other.

EXAMPLE 5

Silicilate crystals were obtained in the same manner as described in Example 1 and applied to a stainless steel support (Krebsöge), which had been provided with a thin layer of silicone paste (Bizon). The support was baked out at 400° C. (temperature increase 1° C./min). Then the support was placed in a bath and, using a level, arranged entirely horizontally. As much 1,1,1-trichloroethane was added as was necessary to precisely fill up the support. Then 50 $\mu$m of a tetraethyl orthosilicate (TEOS) sol (TEOS: water: ethanol = 1:2:4) was poured out over the support. By removal of the solvent (ethanol) from the sol through evaporation and dissolution in the trichloroethane phase, gelation took place. The assembly so obtained was dried overnight and then baked out at 500° C. (temperature increase 1° C./min).

EXAMPLE 6

Silicalite crystals were obtained and applied to an $\alpha$-alumina support in the same manner as in Example 1. The support was introduced into a CVD reactor (horizontal hot-wall reactor). Trimethyl borate (TMB) and tetraethyl orthosilicate (TEOS) were introduced into the reactor via evaporators. The reactant flows were 50 sccm (TMB) and 200 sccm (TEOS), respectively. The unit sccm stands for $cm^3$/min at 25° C. and 1 bar. The deposition was carried out at 700° C. and 0.6 torr. Deposition was performed for 6 hours, which yielded a borosilicate glass layer of a thickness of about 4.8 $\mu$m.

In this manner a homogeneous glass layer was obtained which had been deposited adjacent to and on top of the crystals. Some deposition had also taken place under the crystals.

Using inter alia polishing techniques which are known per se, matrix material could be selectively removed from the top of the crystals. This is demonstrated by photograph 18, where a crystal which had been embedded in a glaze matrix was polished until the crystal surface had been reached. In this case polishing was done using a very fine alumina powder ($\alpha$-$Al_2O_3$, 0.3 $\mu$m diameter; Union Carbide). In the case of borosilicate films, etching techniques also proved eminently useful.

EXAMPLE 7

In the production of a membrane, substantially the method according to Example 1 was used, but now no clay layer was used, in view of the good compatibility of α-alumina and borosilicate glass (pyrex).

Again, the process started from a monolayer of silicalite crystals on a macroporous support. In this case, in an analogous manner to that used with the clay suspension, a suspension of pyrex glass powder (P5; mesh 250) which had first been properly homogenized by ultrasonic vibration, was poured over the support (1 g pyrex P5 powder, 10 g demineralized water). On the support a powder layer was selectively formed beside the silicalite crystals. The borosilicate film (melting point about 800° C.) was baked out at about 825° C. (heating rate 1° C./min).

EXAMPLE 8

A composite membrane was prepared in a manner as described in Example 4, with incorporation of an amount of crystals of the zeolite A type. Zeolites of the type A were synthesized according to Charnell (J. F. Charnell, "Gel Growth of Large Crystals of Sodium A and Sodium X Zeolites", J.Cryst. Growth 8, (1971), 291–294). A mixture of sodium silicate (25.0 g), triethanolamine (56.0 g), sodium aluminate (20.0 g) and 360.1 g water was heated for one week at 75° C. Both single crystals and twined crystals of zeolite A proved to have been formed with a maximum size (cube-shaped) of about 15 μm. Without further processing, these crystals were applied to a two-layer support (alumina; NKA, Petten) by spreading a suspension of crystals over the water-saturated support using a nylon thread. The support was dried at 50° C., whereafter a glaze suspension (see Example 1) was applied by the dip process. The following temperature programme was then carried out: 1° C./min: 20°–95° C.; for 30 min at 95° C.; 1° C./min: 95°–550° C.; for 60 min at 550° C.; 2° C./min: 550°–20° C.

We claim:

1. An inorganic composite membrane comprising
   (a) a macroporous support member,
   (b) a monolayer of molecular sieve crystals deposited upon the support member, the crystals having pores forming a significant included angle with the support member, and
   (c) a gastight matrix selectively deposited upon said support member in the area between molecular sieve crystals.

2. Membrane in accordance with claim 1 wherein the molecular sieve crystals have a one dimensional pore structure and are selected from the group consisting of AlPO$_4$-5, VPI-5, mordenite, Nu-10 crystals and mixtures thereof.

3. Membrane in accordance with claim 1 wherein the molecular sieve crystals have a two dimensional pore structure and are selected from the group consisting of ZSM-5, silicalite and mixtures thereof.

4. Membrane in accordance with claim 1 wherein the molecular sieve crystals have a three dimensional pore structure selected from the group consisting of crystals of zeolites A, X and Y and mixtures thereof.

5. Membrane in accordance with claim 1 wherein the crystals are of a thickness of at least 2 mm and a length and width of at least 10 mm.

6. Membrane in accordance with claim 1 wherein the crystals are deposited upon the matrix substantially with the same orientation.

7. Membrane in accordance with claim 1 wherein the molecular sieve crystals are at least 10 mm in dimension.

8. Membrane in accordance with claim 1 wherein a porous fixing layer is deposited between the support member and the crystals prior to deposition of the gastight matrix.

9. Membrane in accordance with claim 8 wherein the fixing layer is formed from a clay selected from the group consisting of kaolin and baked-out silicone paste.

10. Membrane in accordance with claim 1 wherein the gastight matrix is formed from a glaze, a borosilicate glass, an oxide or a ceramic material.

11. Membrane in accordance with claim 1 wherein catalytic centers are provided in the pores of the membrane and/or on the surface thereof.

12. Method for the preparation of a membrane in accordance with claim 1 which comprises the steps of
    (a) depositing a monolayer of molecular sieve crystals upon the surface of a macroporous inorganic support member, said crystals being oriented such that the pores of the crystals form a significant included angle with the surface of the support, and
    (b) depositing a gastight matrix between said crystals.

13. Method in accordance with claim 12 wherein prior to the deposition of said monolayer upon the support member, a fixing layer is deposited upon the surface of the support member.

14. Method in accordance with claim 13 wherein the fixing layer is derived from kaolin or baked-out silicone paste.

15. Method in accordance with claim 12 wherein the gastight matrix is selected from the group consisting of a glaze, a borosilicate glass, an oxide and a ceramic material.

16. Method in accordance with claim 12 wherein the matrix material deposited upon the molecular sieve crystals is removed by polishing or etching techniques.

17. Method in accordance with claim 12 wherein the porous support member is removed to obtain a self-supporting membrane film.

18. Method in accordance with claim 12 wherein catalytic centers are provided in the pores and/or on the surfaces of said crystals.

* * * * *